Patented Aug. 19, 1930

1,773,702

UNITED STATES PATENT OFFICE

RICHARD O. BAILEY, OF ONEIDA, AND WILLIAM S. MURRAY, OF UTICA, NEW YORK, ASSIGNORS TO ONEIDA COMMUNITY, LIMITED, OF ONEIDA, NEW YORK, A CORPORATION OF NEW YORK

PROCESS FOR PRODUCING TARNISH-RESISTING SILVER AND SILVER PLATE

No Drawing.   Application filed December 14, 1925. Serial No. 75,386.

In the production of silver-plated articles, for example, the plated articles, after the usual washing, burnishing, buffing, rinsing and drying operations, are polished with a mixture of kerosene and lampblack, for the purpose of "coloring" them, which means in the art and here, bringing out their silver color, such mixture being applied to the silver surface by means of a canton flannel or cotton covered buffing wheel. Where a grey finish is required the surface is treated for the production of such grey finish before such "coloring" treatment with kerosene and lampblack.

Plated articles so treated (and this would be true of solid silver articles) tarnish readily or quickly and therefore require repeated cleaning and polishing by dealers handling them.

We have discovered that this tendency to tarnish is due to impurities in the kerosene or lamp black used or (stated differently) that this tendency is very materially diminished by the use, in the "coloring" operation, of kerosene and lamp black which are free from sulphur or other tarnishing or tarnish-producing elements.

We have also discovered that if a small quantity of an element of the halogen group (preferably iodine) be added to the kerosene and lamp black mixture free from tarnishing or tarnish-producing elements, the tendency to tarnish is very materially reduced and a silver or silver-plated article is produced which will withstand tarnishing for a much longer time than articles heretofore produced by the use of the ordinary kerosene and lamp black mixture.

In practicing the invention, therefore, we use in the "coloring" treatment of the silver or silver plate a mixture of kerosene and lamp black which is free from tarnishing or tarnish-producing elements and to which we add a small amount of iodine, constituting about 1% of the total mixture. This mixture is then applied to the silver surface in the usual manner, that is to say, by the use of a canton flannel or cotton covered buffing wheel.

The mixture used is preferably prepared as follows: The 1% of iodine, by weight, is dissolved in the kerosene and this mixture has added to it enough lampblack to form a paste of suitable consistency for application to and its retention by the canton flannel or cotton covering of the buffing wheel.

What is claimed is:

1. The process of treating silver and silver plated articles for the purpose of rendering the surface of the article tarnish resistant, which consists in polishing the surface thereof with a mixture of kerosene and lampblack, said mixture being free from tarnishing or tarnish-producing ingredients.

2. The process of treating silver and silver plated articles for the purpose of rendering the surface of the article tarnish resistant, which consists in polishing the surfaces thereof with a mixture of kerosene and lampblack, said mixture being free from tarnishing or tarnish-producing ingredients and containing iodine.

In testimony whereof, we have hereunto set our hands.

RICHARD O. BAILEY.
WILLIAM S. MURRAY.